US012395771B2

(12) United States Patent
Witham et al.

(10) Patent No.: US 12,395,771 B2
(45) Date of Patent: Aug. 19, 2025

(54) MOUNTING DEVICE

(71) Applicant: Swarm Holdings LLC., Salt Lake City, UT (US)

(72) Inventors: Christopher Scott Witham, Midvale, UT (US); Jonathan Neil Hart, Salt Lake City, UT (US); Taylor Hill, Idaho Falls, ID (US)

(73) Assignee: SWARM HOLDINGS LLC., Salt Lake City, UT (US)

( * ) Notice: Subject to any disclaimer, the term of this patent is extended or adjusted under 35 U.S.C. 154(b) by 204 days.

(21) Appl. No.: 18/243,654

(22) Filed: Sep. 7, 2023

(65) Prior Publication Data

US 2025/0088780 A1 Mar. 13, 2025

(51) Int. Cl.
*H04R 1/02* (2006.01)

(52) U.S. Cl.
CPC .................................... *H04R 1/026* (2013.01)

(58) Field of Classification Search
CPC .......................... H04R 1/026; H04R 2201/021
See application file for complete search history.

(56) References Cited

U.S. PATENT DOCUMENTS

| | | | | |
|---|---|---|---|---|
| 2021/0244200 | A1* | 8/2021 | Webb | F16B 12/10 |
| 2024/0121542 | A1* | 4/2024 | Kim | G01C 19/5783 |
| 2025/0052361 | A1* | 2/2025 | Quaglieri | F16M 11/08 |

FOREIGN PATENT DOCUMENTS

CN 217116325 U * 8/2022

* cited by examiner

*Primary Examiner* — Matthew A Eason
(74) *Attorney, Agent, or Firm* — Jason P. Webb; Pearson Butler

(57) ABSTRACT

There is a housing; a first collet assembly coupled to the housing, including: a clamping member having a slotted interior with sloped sides that create a narrowing interior towards a front face of the clamping member; a collet trapped within the slotted interior of the clamping member and oriented towards the front face, wherein a diameter of the collet is smaller than a length of the slotted interior such that the collet travels along the slotted interior; and a mechanism functionally coupled to the clamping member that moves the clamping member relative to the collet between a first mode and a second mode, wherein in the first mode the sloped sides pinch the collet more than the sloped sides pinch the collet in the second mode.

20 Claims, 5 Drawing Sheets

MOUNTING DEVICE

BACKGROUND OF THE INVENTION

Field of the Invention

The present invention relates to mounting devices, specifically mounting devices for mounting objects to walls and brackets.

Description of the Related Art

Televisions and other screens are often so thin or lightweight that they require additional external speakers. Soundbars are popular options as external speakers to be used with screens. Soundbars provide a depth and richness in sound.

Often, soundbars are placed directly on top of an entertainment unit. However, this can clutter a space and make the installation less visually appealing. Alternatively, screens are often mounted to walls with external speakers or soundbars mounted directly below. In these instances, aesthetics are improved; however, the installation of a speaker directly below a screen can be an arduous process.

Speakers can be heavy, and difficult for one person alone to lift and hold into place as they are mounted to a wall. It is also difficult to align a speaker with a screen so that both are level. It may take several tries to mount a speaker with a screen so that both flush and level and aesthetically pleasing. Accordingly, it may take upwards to an hour, with several persons helping, to mount an external speaker to a wall below a screen.

The inventions heretofore known suffer from a number of disadvantages which include being too large, not being safe to use, being more inconvenient to use, being harder to use, taking longer to install, not having access from a front side, and being difficult to access.

What is needed is a mounting device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available mounting devices. Accordingly, the present invention has been developed to provide a mount for mounting structures to walls, including but not limited to mounting soundbars to walls (e.g. directly under a wall-mounted television set).

In one embodiment of the invention, there may be a speaker mount that may comprise: a housing; a first collet assembly that may be coupled to the housing, that may include: a clamping member that may have a slotted interior with sloped sides that may create a narrowing interior towards a front face of the clamping member; a collet that may be trapped within the slotted interior of the clamping member and/or oriented towards the front face, wherein a diameter of the collet may be smaller than a length of the slotted interior such that the collet travels along the slotted interior; and/or a mechanism that may be functionally coupled to the clamping member that may move the clamping member relative to the collet between a first mode and/or a second mode, wherein in the first mode the sloped sides may pinch the collet more than the sloped sides may pinch the collet in the second mode. There may also be a second collet assembly that may be coupled to the housing substantially identical to the first collet assembly, wherein a length of the slotted interior of the second collet assembly may be parallel to the length of the slotted interior of the first collet assembly.

In another embodiment, wherein the clamping member may include two sloped sides. The two sloped sides may be angled such that lines created by those angles may converge beyond the front face of the clamping member. The first and second collets may be cone-shaped. Each collet may have a first diameter at a first end and/or a second diameter at a second end, wherein the first diameter may be smaller than the second diameter, and/or the first end may be slidably disposed along the slotted interior of the clamping member.

Yet, in another embodiment, the mechanism may be functionally coupled to the clamping member at an interference joint. The mechanism may be a cam lever. The cam lever may be U-shaped. The cam lever may be functionally coupled to a lip of the clamping member. The lip may be a ball bearing. The second collet assembly may be coupled to the housing near an end opposite the first collet assembly. The housing may be oblong.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
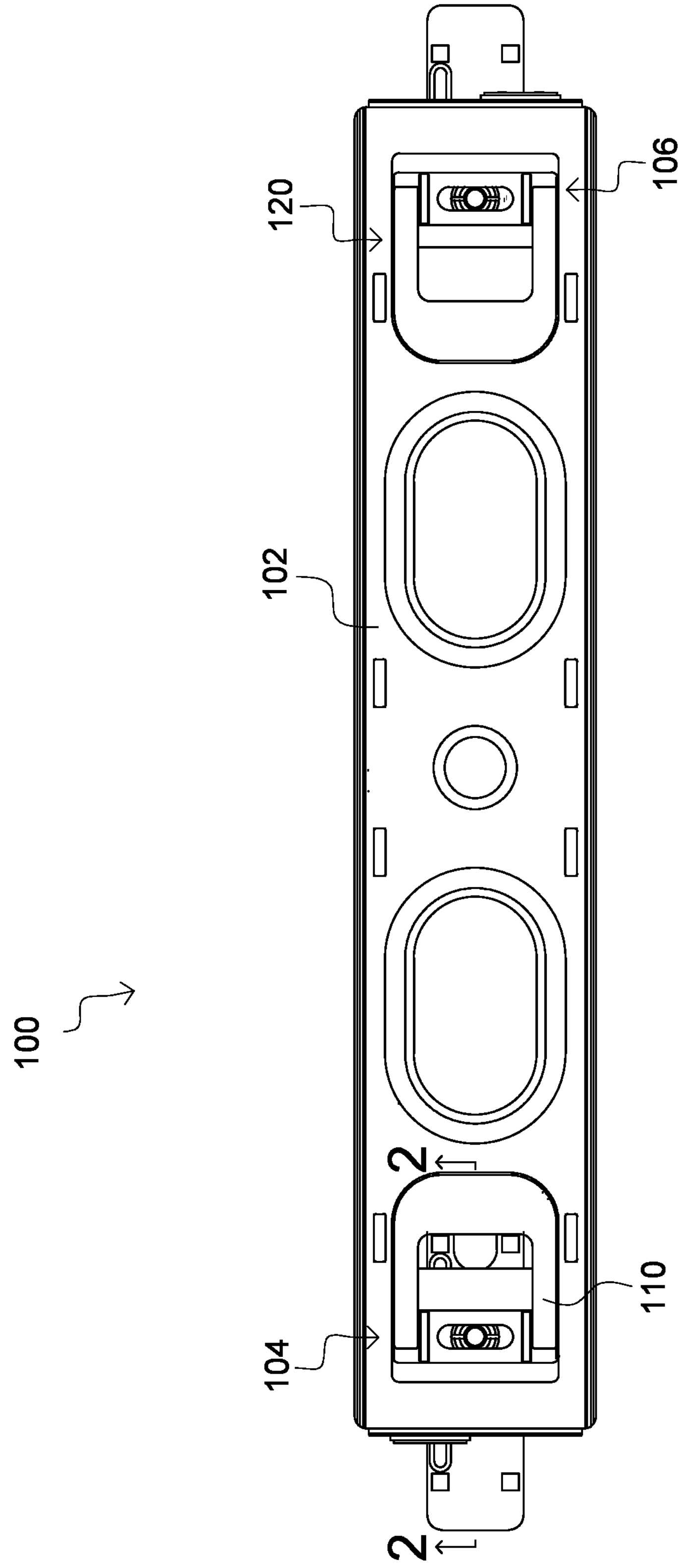
FIG. 1 is a top plan view of a speaker mount, showing a mechanism in a first mode, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a top plan view of a speaker mount, showing a mechanism in a first mode, according to one embodiment of the invention. There is shown a speaker mount 100 with a housing 102. Coupled to the housing 102 are a first collet assembly 104 and a second collet assembly 106. The collet assemblies 104 and 106 include a mechanism 110. The illustrated speaker mount allows an installer to conveniently and quickly place, level, and secure a sound bar to a wall.

As illustrated, the first and second collet assemblies 104 and 106 are shown disposed near opposite ends of the housing 102. The collet assemblies 104 and 106 are also shown disposed parallel to one another. The first collet assembly 104 and second collet 106 assembly are identical.

The illustrated mechanism 110 is shown in a first mode 120. In the first mode 120, the mechanism 110 is closed and flush with the housing 102. The first mode 120 of the mechanism allows one to secure the collet assemblies 104 and 106 and mount the speaker mount 100 to a bracket, peg, or a wall. In particular, in the first mode, the mechanism squeezes, pinches, or otherwise applies pressure, directly or indirectly, to the collet which compresses the collet (i.e. reducing the space between opposing surfaces that form the slit of the collet) thereby causing the collet to grasp a matching-sized/shaped protruding member that extends into the cavity of the collet. In the second mode, the mechanism applies a reduced pressure, including but not limited to no pressure at all) thereby allowing the slit of the collet to expand and thus releasing the grip of the collet on the protruding member.

Figure 2:
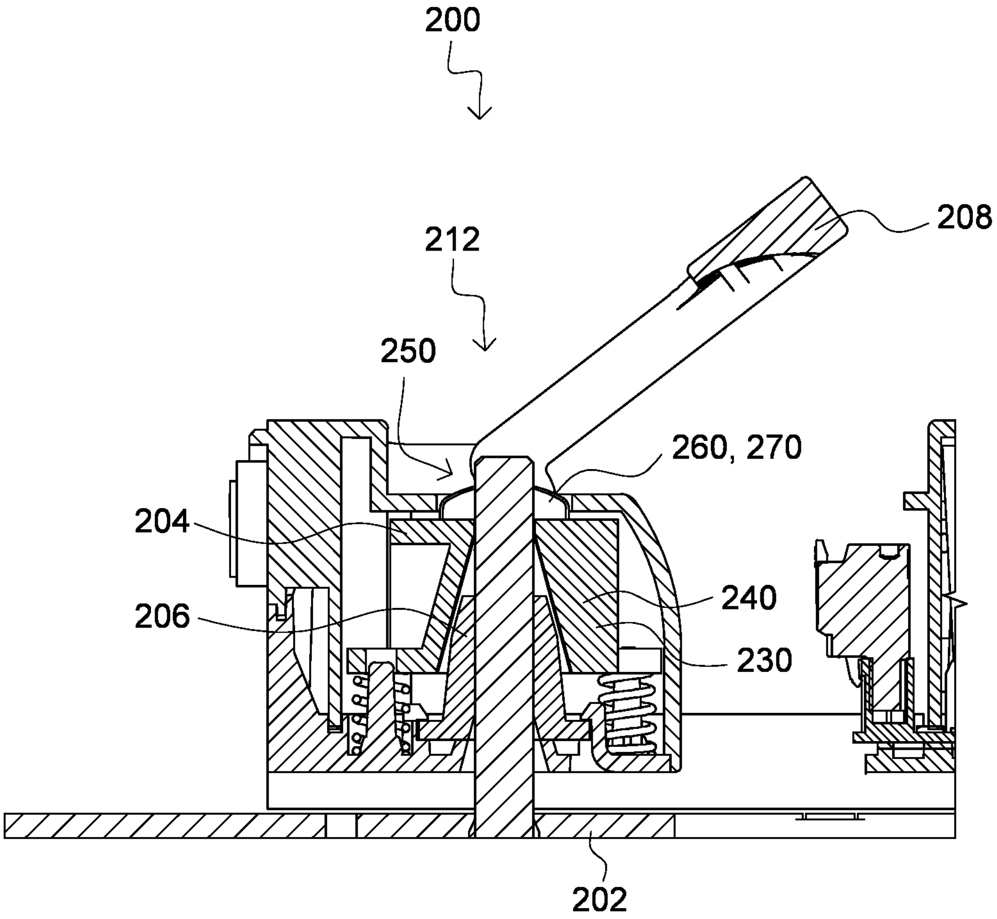
FIG. 2 is a side partial sectional view of a speaker mount, showing a mechanism in a second mode, according to one embodiment of the invention.

As shown, FIG. 2 illustrates a side sectional view of a speaker mount, showing a mechanism in a second mode, according to one embodiment of the invention. There is illustrated a first collet assembly 200 disposed within a housing 202. The first collet assembly includes a clamping member 204, a collet 206, and a mechanism 208. In the illustrated embodiment, the mechanism selectively applies pressure to the collet via the clamping member.

The illustrated clamping member 204 is disposed between the collet 206 and the mechanism 208. The clamping member 204 has a slotted interior 210 such that the slotted interior 210 is a long narrow aperture. The slotted interior 210 also has sloped sides that created a narrowing interior towards a front face 212 of the clamping member 204. The clamping member may be functionally coupled to a bias member (not shown, e.g. a coil spring or leaf spring) that biases the clamping member to not positioned such that its sloped sides are not pressed against the collet, thereby providing free travel of the collet through the slot when the clamping member is not being forced against the collet by the mechanism. Alternatively, there may be no separate bias member and the device may return to a non-compressed state merely by relieving pressure from the mechanism and allowing the structures to decouple on their own interaction.

As illustrated, a collet 206 is disposed within the slotted interior 210 of the clamping member 204 and oriented towards the front face 212. The collet 206 is disposed opposite the mechanism 208. The collet 206 is trapped within the slotted interior 210 and slides along the slotted interior 210, which allows for the installer to level the mount by where the collet is disposed within the slot of the slotted interior. A diameter of collet 230 is smaller than a length of slotted interior 240 such that the collet 206 travels along the slotted interior 210. A diameter of the collet is larger than a minimum width of the slotted interior such that when the slotted interior is pressed against the collet by the mechanism than the sloped walls engage with the collet and apply compressive pressure thereagainst. The collet is shaped and positioned such that when such pressure is applied the slit of the collet narrows, thereby causing the collet to clamp down on any appropriately shaped protrusion (e.g. a post from a wall mount) disposed therein.

In one embodiment, the collet 206 may slide over a post from a bracket. The collet 206 may fit over the steel post by friction-fit. The collet 206 may be cone-shaped, may have an angled surface, and may include one or more slits along its surface. The collet 206 may be functionally coupled to the clamping member 204 to slide up and down and/or in and out of the slotted interior 210 of the clamping member 204. Accordingly, the collet 206 may be squeezed by the clamping member 204 to securely close around a post when the mechanism 208 is in a first mode (FIG. 1, item 120).

The illustrated mechanism 208 is coupled to the clamping member 204 opposite the collet 206. The mechanism 208 is functionally coupled to the clamping member 204 and moves the clamping member 204 relative to the collet 206 between a first mode (FIG. 1, item 120) and a second mode 220. In the first mode (FIG. 1, item 120) the sloped sides of the slotted interior 210 pinch the collet 206 more that the sloped sides of the slotted interior 210 pinch the collet 206 in the second mode 220. The mechanism 208 may be functionally coupled to the clamping member 204 at an interference joint.

In one embodiment, the mechanism 208 may rotate relative to the housing 202. The mechanism 208 may be a cam lever or other handled lever that pushes down on the clamping member 204 and collet 206 when in a first mode (FIG. 1, item 120). In a second mode, the mechanism 208 may rotate open and release the collet 206 from a post so that a position of the collet assembly 200 and housing 202 may be adjusted.

In operation of one embodiment of the invention, the speaker mount is designed to make custom soundbars easy to mount and set their depth from the front side. The speaker mount has three pieces: a mechanism or handle or cinching piece or cam lever; a clamping member or pusher piece; and a collet. The clamping member is pushed down as the cam lever is activated. The clamping member has an angled slot and is pushed down on the collet as the cam lever is activated. When the clamping member is pushed down on the collet, a diameter of the collet decreases, and the collet squeezes a bracket or peg for mounting.

In operation of another embodiment, the speaker mount allows a soundbar to mount below a television without gaps or errors with leveling. The soundbar is mounted quickly after a television is mounted to a wall bracket. The speaker mount is clamped from the front side in seconds, and then a grill is placed over the speaker mount to cover the components of the mounting device.

Figure 3:
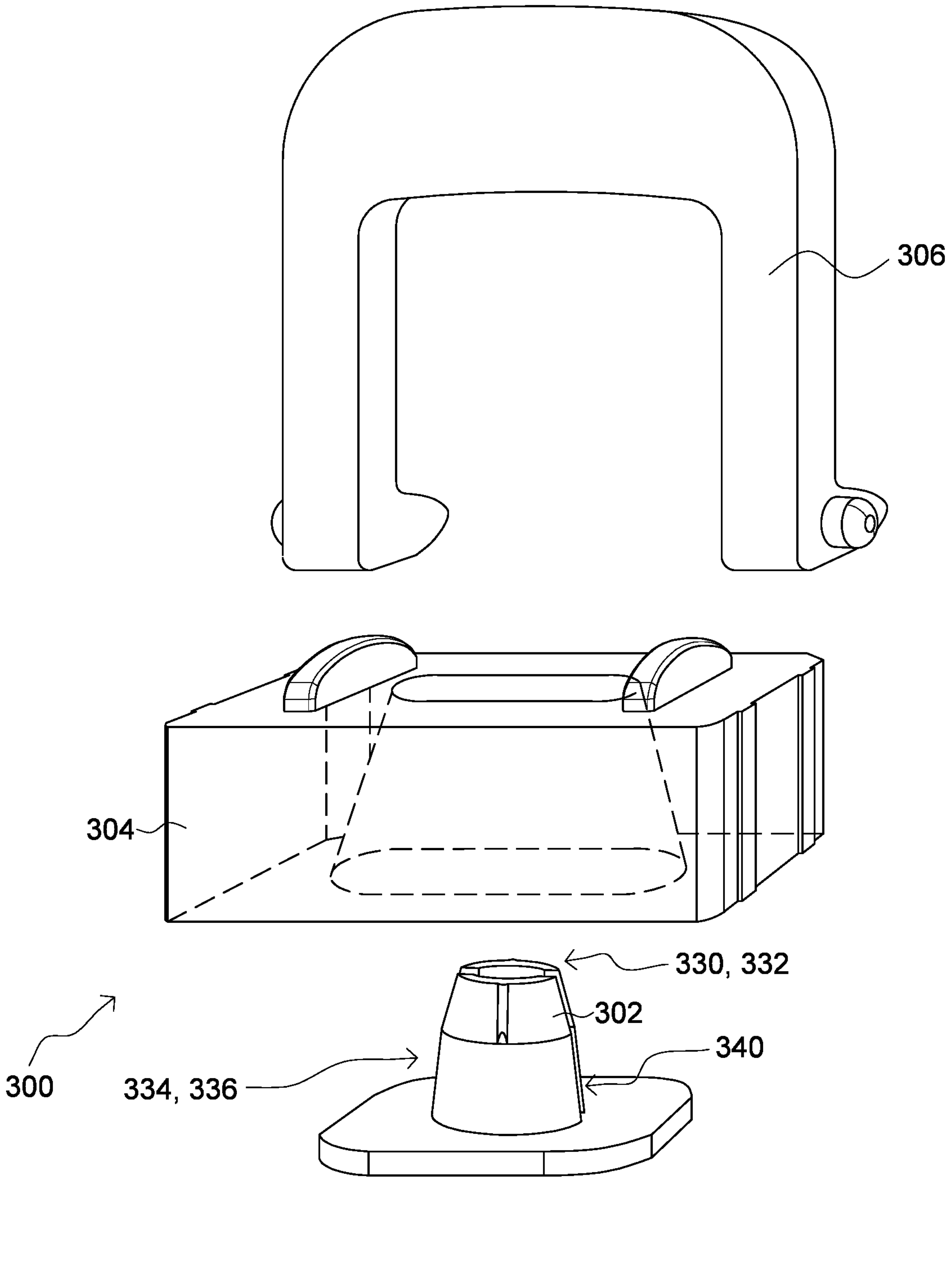
FIG. 3 is an exploded side perspective view of a collet assembly, showing a clamping member, a collet, and a mechanism, according to one embodiment of the invention.

FIG. 3 illustrates an exploded side perspective view of a collet assembly, according to one embodiment of the invention. There is shown a collet assembly 300 including a collet 302, a clamping member 304, and a mechanism 306. The illustrated collet 302 is cone-shaped and has a first diameter 330 at a first end 332 and a second diameter 334 at a second end 336, with the first diameter 330 being smaller than the second diameter 334. Accordingly, the first end 332 may be slidably disposed within the clamping member 304.

The collet 302 also includes a slit 340 for adjusting a size of the first and second diameters 330 and 334. In one embodiment, the collet 302 may be pinched closed by pushing down on the clamping member 304. The clamping member 304 may be pushed down on by the mechanism 306.

Figure 4:
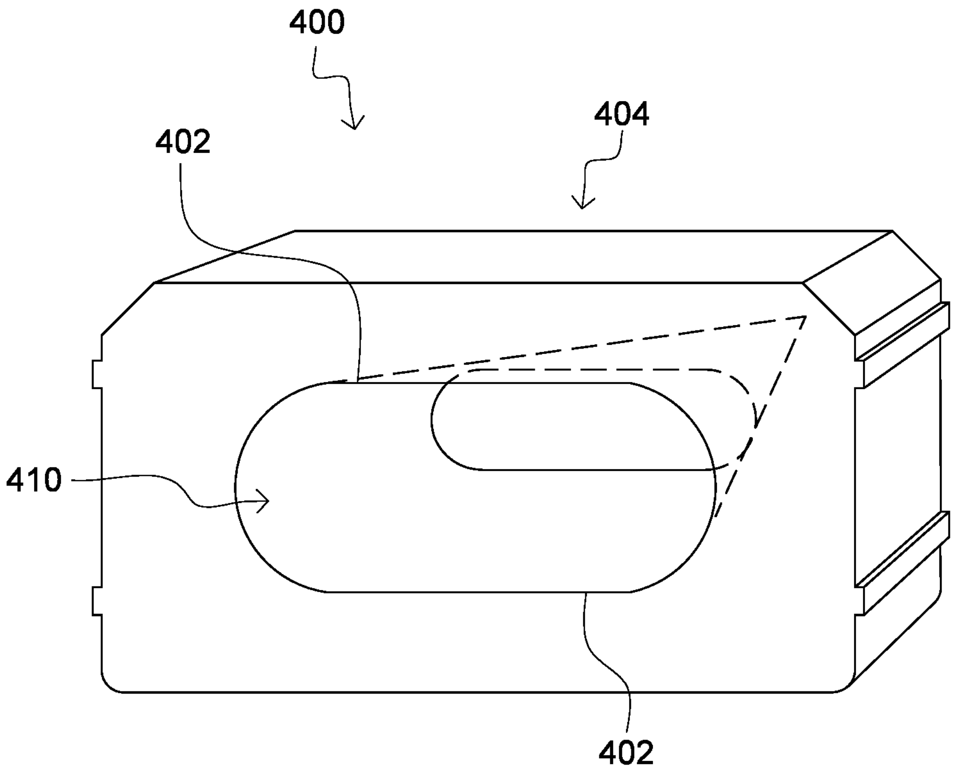
FIG. 4 is a bottom perspective view of a clamping member, according to one embodiment of the invention.

As shown, FIG. 4 illustrates a side perspective view of a clamping member, according to one embodiment of the invention. There is illustrated a clamping member 400. As shown, the clamping member 400 has two sloped sides 402. The two sloped sides 402 are angled such that lines from those sides converge near a front face 404 of the clamping member 400. The two sloped sides 402 may be angled such that the clamping member 400 has a slotted interior 410 that is an elongated channel with sloped sides such as a trapezoidal channel with openings along its bases.

Figure 5:
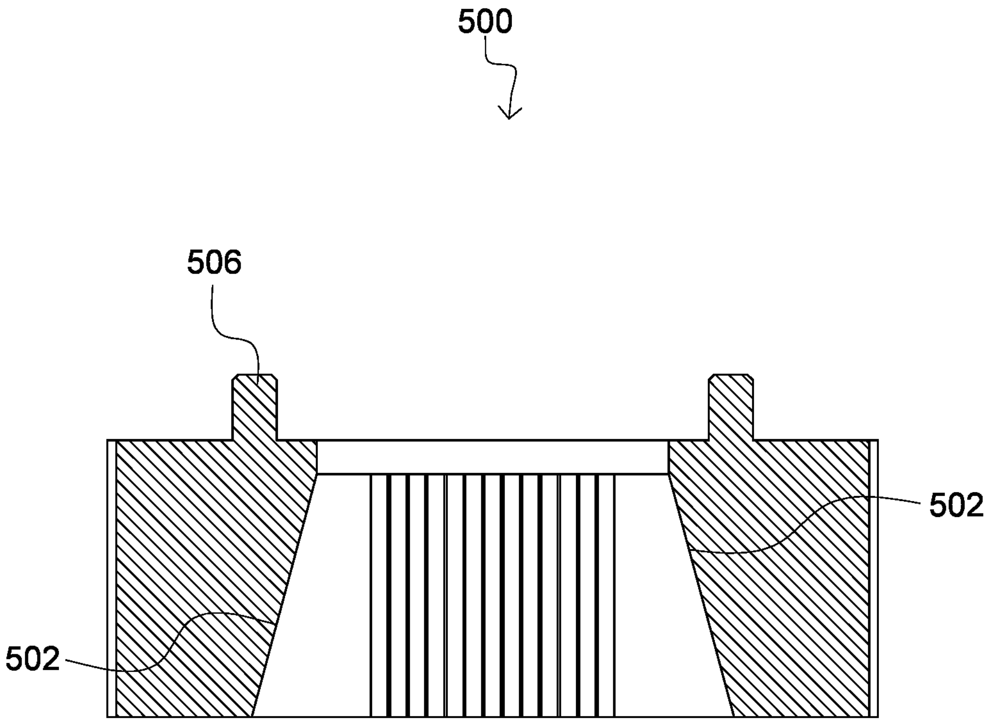
FIG. 5 is a side sectional view of a clamping member, according to one embodiment of the invention.

FIG. 5 illustrates a side sectional view of a clamping member, according to one embodiment of the invention. There is shown a clamping member 500. As illustrated, the clamping member 500 has an angled slot 502. The clamping member 500 also has a lip 506 for functionally coupling the clamping member 500 to a mechanism (FIG. 1, item 110). In one, non-limiting embodiment, the lip 506 may be a ball bearing.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a soundbar, it is understood that the mounting device or speaker mount may be incorporated within another type of speaker, or object, for hanging or mounting. Also, the collet, the clamping member, and the mechanism may be sold as separate pieces or sold integral to a sound bar. The collet, the clamping member, and the mechanism may be sold as a kit for mounting objects.

It is also expected that there could be numerous variations of the design of this invention. An example is that the mechanism may be any mechanism to close the collet. For instance, in one embodiment, the mechanism may pull, rather than push, on the clamping member to close the collet. Further, the mechanism may have any shape, such as, but not limited to: U-shaped, C-shaped, L-shaped, V-shaped, I-shaped, and so on. Further, the mechanism may be a single protrusion or finger. Additionally, although the figures illustrate a clamping mechanism that is substantially oval-shaped, it is understood that the clamping mechanism may have any shape with a slot with two angled sides.

Finally, it is envisioned that the components of the device may be constructed of a variety of materials, such as, but not limited to: plastic, metal, composites, and/or rubber.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A speaker mount, comprising:

a. a housing;

b. a first collet assembly coupled to the housing, including:

i. a clamping member having a slotted interior with sloped sides that create a narrowing interior towards a front face of the clamping member;

ii. a collet trapped within the slotted interior of the clamping member and oriented towards the front face, wherein a diameter of the collet is smaller than a length of the slotted interior such that the collet travels along the slotted interior; and iii. a mechanism functionally coupled to the clamping member that moves the clamping member relative to the collet between a first mode and a second mode, wherein in the first mode the sloped sides pinch the collet more than the sloped sides pinch the collet in the second mode; and c. a second collet assembly coupled to the housing substantially identical to the first collet assembly, wherein a length of the slotted interior of the second collet assembly is parallel to the length of the slotted interior of the first collet assembly.

2. The speaker mount of claim 1, wherein the clamping member includes two sloped sides.

3. The speaker mount of claim 2, wherein the two sloped sides are angled such that lines created by those angles converge beyond the front face of the clamping member.

4. The speaker mount of claim 1, wherein the first and second collets are cone-shaped, each collet having a first diameter at a first end and a second diameter at a second end, wherein the first diameter is smaller than the second diameter, and the first end is slidably disposed along the slotted interior of the clamping member.

5. The speaker mount of claim 1, wherein the mechanism is functionally coupled to the clamping member at an interference joint.

6. The speaker mount of claim 1, wherein the mechanism is a cam lever.

7. The speaker mount of claim 5, wherein the cam lever is U-shaped.

8. The speaker mount of claim 5, wherein the cam lever is functionally coupled to a lip of the clamping member.

9. The speaker mount of claim 8, wherein the lip is a ball bearing.

10. The speaker mount of claim 1, wherein the second collet assembly is coupled to the housing near an end opposite the first collet assembly.

11. The speaker mount of claim 1, wherein the housing is oblong.

12. A speaker mount, comprising:

a. a housing;

b. a first collet assembly coupled to the housing, including:

i. a clamping member having a slotted interior with sloped sides that create a narrowing interior towards a front face of the clamping member;

ii. a collet trapped within the slotted interior of the clamping member and oriented towards the front face, wherein a diameter of the collet is smaller than a length of the slotted interior such that the collet travels along the slotted interior; and iii. a mechanism functionally coupled to the clamping member in two places on opposite sides of the slot.

13. The speaker mount of claim 12, wherein the clamping member includes two sloped sides.

14. The speaker mount of claim 13, wherein the two sloped sides are angled such that lines created by those angles converge beyond the front face of the clamping member.

15. The speaker mount of claim 12, wherein the collet is cone-shaped, having a first diameter at a first end and a second diameter at a second end, wherein the first diameter is smaller than the second diameter and is slidably disposed along the slotted interior.

16. The speaker mount of claim 12, wherein the mechanism is functionally coupled to the clamping member at an interference joint.

17. The speaker mount of claim 12, wherein the mechanism is a cam lever.

18. The speaker mount of claim 17, wherein the cam lever is U-shaped.

19. The speaker mount of claim 17, wherein the cam lever is functionally coupled to a lip of the clamping member.

20. A speaker mount, comprising:

a. a housing;

b. a first collet assembly coupled to the housing, including:

i. a clamping member having a slotted interior with sloped sides that create a narrowing interior towards a front face of the clamping member;

ii. a collet trapped within the slotted interior of the clamping member and oriented towards the front face, wherein a diameter of the collet is smaller than a length of the slotted interior such that the collet travels along the slotted interior;

iii. a mechanism functionally coupled to the clamping member that moves the clamping member relative to the collet between a first mode and a second mode, wherein in the first mode the sloped sides pinch the collet more than the sloped sides pinch the collet in the second mode, c. wherein the clamping member includes two sloped sides;

d. wherein the two sloped sides are angled such that lines created by those angles converge beyond the front face of the clamping member;

e. wherein the collet is cone-shaped, having a first diameter at a first end and a second diameter at a second end, wherein the first diameter is smaller than the second diameter and is slidably disposed along the slotted interior;

f. wherein the mechanism is functionally coupled to the clamping member at an interference joint; and g. wherein the mechanism is a U-shaped cam lever, the cam lever being functionally coupled to a lip of the clamping member.

* * * * *